United States Patent
Borlick et al.

(10) Patent No.: US 11,354,208 B2
(45) Date of Patent: Jun. 7, 2022

(54) ADJUSTMENT OF SAFE DATA COMMIT SCAN BASED ON OPERATIONAL VERIFICATION OF NON-VOLATILE MEMORY

(71) Applicant: INTERNATIONAL BUSINESS MACHINES CORPORATION, Armonk, NY (US)

(72) Inventors: Matthew G. Borlick, Tucson, AZ (US); Sean Patrick Riley, Tucson, AZ (US); Brian Anthony Rinaldi, Tucson, AZ (US); Trung N. Nguyen, Vail, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

(21) Appl. No.: 16/568,105

(22) Filed: Sep. 11, 2019

(65) Prior Publication Data
US 2021/0073090 A1 Mar. 11, 2021

(51) Int. Cl.
*G06F 11/20* (2006.01)
*G06F 11/14* (2006.01)

(52) U.S. Cl.
CPC ...... *G06F 11/2092* (2013.01); *G06F 11/1461* (2013.01); *G06F 11/2069* (2013.01); *G06F 11/2079* (2013.01); *G06F 11/2097* (2013.01); *G06F 2201/82* (2013.01)

(58) Field of Classification Search
CPC ............. G06F 11/1423; G06F 11/1458; G06F 11/1461; G06F 11/1666; G06F 11/2023; G06F 11/2028; G06F 11/203; G06F 11/2033; G06F 11/2069; G06F 11/2079;
(Continued)

(56) References Cited

U.S. PATENT DOCUMENTS 5,437,022 A * 7/1995 Beardsley ........... G06F 11/1666 711/120
5,771,367 A * 6/1998 Beardsley ........... G06F 11/1435 711/113

(Continued)

OTHER PUBLICATIONS

Chang, Jeff., NVDIMM-N Cookbook: A Soup-to-Nuts Primary on Using NVDIMM-Ns to Improve Your Storage Performance, 2015, SNIA, Retrieved from Internet <https://www.snia.org/educational-library/nvdimm-cookbook-soup-nuts-primer-using-nvdimms-improve-your-storage-performance> (Year: 2015).*

*Primary Examiner* — Matthew M Kim
*Assistant Examiner* — Albert Li
(74) *Attorney, Agent, or Firm* — Konrad Raynes Davda & Victor LLP; Rabindranath Dutta

(57) ABSTRACT

A first non-volatile dual in-line memory module (NVDIMM) of a first server and a second NVDIMM of a second server are armed during initial program load in a dual-server based storage system to configure the first NVDIMM and the second NVDIMM to retain data on power loss. Prior to initiating a safe data commit scan to destage modified data from the first server to a secondary storage, a determination is made as to whether the first NVDIMM is armed. In response to determining that the first NVDIMM is not armed, a failover is initiated to the second server.

18 Claims, 11 Drawing Sheets

(58) Field of Classification Search
CPC .............. G06F 11/2089; G06F 11/2092; G06F 11/2097; G06F 2201/82
See application file for complete search history.

(56) References Cited

U.S. PATENT DOCUMENTS

| | | | | |
|---|---|---|---|---|
| 6,006,342 | A * | 12/1999 | Beardsley | G06F 11/2097 714/5.11 |
| 6,438,647 | B1 * | 8/2002 | Nielson | G06F 11/2092 711/113 |
| 7,743,209 | B2 | 6/2010 | Takada et al. | |
| 9,298,617 | B2 | 3/2016 | Chambliss et al. | |
| 9,354,994 | B2 | 5/2016 | Coronado et al. | |
| 9,665,308 | B2 | 5/2017 | Crawford et al. | |
| 2003/0212864 | A1 * | 11/2003 | Hicken | G06F 11/2092 711/122 |
| 2008/0082856 | A1 * | 4/2008 | French | G06F 11/2089 714/2 |
| 2015/0135003 | A1 * | 5/2015 | Cota-Robles | G06F 12/0815 714/6.3 |
| 2018/0067961 | A1 | 3/2018 | Yang et al. | |
| 2018/0095896 | A1 | 4/2018 | Bachar et al. | |

\* cited by examiner

ADJUSTMENT OF SAFE DATA COMMIT SCAN BASED ON OPERATIONAL VERIFICATION OF NON-VOLATILE MEMORY

BACKGROUND

1. Field

Embodiments relate to adjustment of safe data commit scan based on operational verification of non-volatile memory.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices. The storage system may also be referred to as a storage controller.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system, either server can failover to the other if there is a failure or a planned downtime for one of the two servers. For example, a first server may failover to the other is there is a failure of a second server.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server. The NVS copy of the write data may be accessed if a write failure occurs and the cache is empty or possibly invalid in the owning server. Otherwise, the NVS copy of the write data is discarded after destage operations from cache to the storage drives are complete.

In the event of a power loss or device failure in the cache, data not yet successfully destaged to secondary storage from cache may be lost. To avoid the loss of data, storage systems may employ a safe data commit scan mechanism which scans the cache directory for modified data to be destaged to secondary storage. Such a scan of the cache directory may be initiated on a periodic basis, such as on the hour. Storage systems may note the time when a safe data commit scan is started. When the safe data commit scan completes, the safe data commit scan start time may be displayed in a log. As a consequence, an operator may be assured that anything written to cache prior to the safe data commit scan start time has been successfully destaged and is safely stored in the secondary storage. In the event of a data loss, only data that was written to cache after the safe data commit scan start time, may need to be restored.

SUMMARY OF THE PREFERRED EMBODIMENTS

Provided are a method, a system, a computer program product in which a first non-volatile dual in-line memory module (NVDIMM) of a first server and a second NVDIMM of a second server are armed during initial program load in a dual-server based storage system to configure the first NVDIMM and the second NVDIMM to retain data on power loss. Prior to initiating a safe data commit scan to destage modified data from the first server to a secondary storage, a determination is made as to whether the first NVDIMM is armed. In response to determining that the first NVDIMM is not armed, a failover is initiated to the second server.

In further embodiments, in response to determining that the second NVDIMM is not armed, a time interval between successive safe data commit scans in the second server is decreased.

In yet further embodiments, in response to determining that the first NVDIMM has become armed once again in the first server and the first server has become operational, the time interval between successive safe data commit scans is changed to a predetermined time that is a standard time between successive safe data commit scans.

In additional embodiments, in response to completion of a safe data commit scan in the second server, and in response to determining that NVDIMM usage in the second server is greater than a predetermined threshold or a predetermined time that is a standard time between successive safe data commit scans has expired, starting a new safe data commit scan.

In certain embodiments, in response to determining that the second NVDIMM is armed, the failover to the second server is completed.

In further embodiments, the dual-server based storage system maintains a first cache and a first non-volatile storage (NVS) comprising the first NVDIMM in the first server, and a second cache and a second NVS comprising the second NVDIMM in the second server, wherein data in the first cache is also written in the second NVS and data in the second cache is also written in the first NVS.

In certain embodiments, the first NVDIMM or the second NVDIMM becomes unarmed after the initial program load, in response to a defect in the dual-server based storage system.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain embodiments, the NVS of a storage controller may be comprised of one or more non-volatile dual in-line memory modules (NVDIMM), where a NVDIMM is a type of non-volatile random-access memory for computers. The term "dual in-line" identifies the memory as using the DIMM package. In certain embodiments, NVDIMMs are "armed" (i.e., activated to save data even if a power loss occurs) during the Initial Machine Load (IML) of the storage controller, where the storage controller uses the IML to store the power-on self-test (POST) and Basic Input/Output System (BIOS) code. NVDIMMs provide a much faster memory than a battery backed NVS.

However, in certain embodiments, an NVDIMM that has been armed during IPL may not remain armed because of a variety of reasons, such as, a hardware error, a code bug, a malicious attack, a diagnostics running on the NVDIMM etc. The NVDIMMs may also be armed to provide encryption of data, and the unarming (i.e., losing the armed status) of the NVDIMM may also result in data not being encrypted in the NVDIMM.

If an NVDIMM is not armed, then a power loss event occurring in the storage controller may lead to loss of data or loss of encrypted data as the NVDIMM is not backing up data in non-volatile memory.

In certain embodiments, in order to facilitate recovery from loss of data, the safe data commit scan process checks to determine whether the NVDIMM is armed before starting a safe data commit scan on a server of a dual-server based storage controller. In case the NVDIMM of a server is not armed, a failover is initiated to the other server. In certain embodiments, if the NVDIMM of both servers are not armed, the frequency of performing safe data commit scans is increased, and as a result improvements are provided to a dual-server based storage controller to avoid data loss. Data is staged more frequently to the secondary storage when the NVDIMMs of both servers of a dual-server storage controller are not armed and this reduces the likelihood of data loss.

EXEMPLARY EMBODIMENTS

Figure 1:
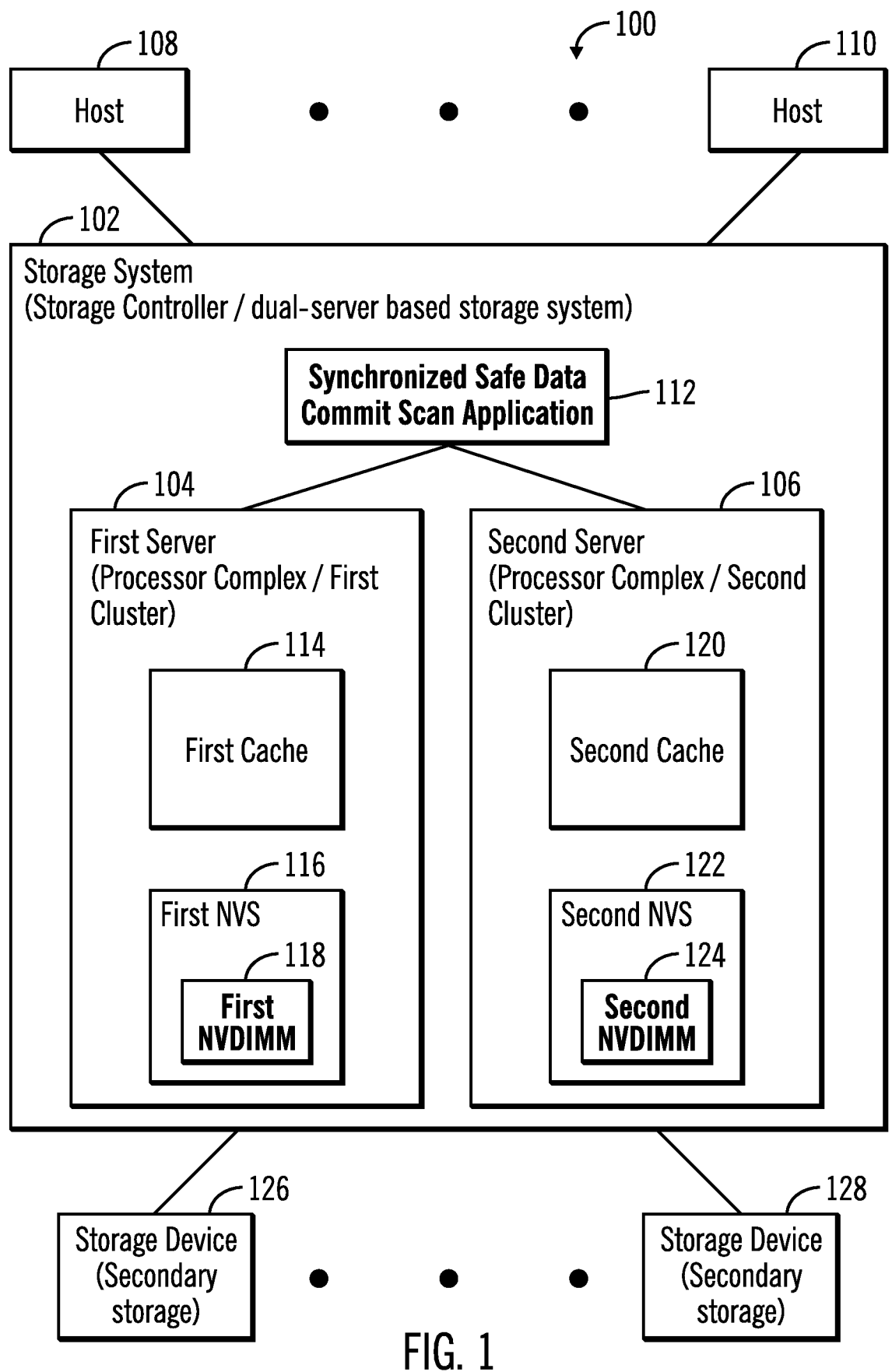
FIG. 1 illustrates a block diagram of a computing environment comprising a storage system comprising a first server and a second server, where the storage system communicates with a plurality of hosts over a network, and where a synchronized safe data commit scan application executes in the storage system, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network, and where a synchronized safe data commit scan application 112 executes in the storage system 102, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processing complex and may include one or more processors and/or processor cores, and the storage system 102 may also be referred to as a dual-server based storage system or a storage controller.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

The first server 104 includes memory comprising a first cache 114 and a first NVS 116 comprising a first NVDIMM 118, and the second server 106 includes memory comprising a second cache 120 and a second NVS 122 comprising a second NVDIMM 124. In alternative embodiments, an NVS (e.g., NVS 116, 122) may have more than one NVDIMM.

The cache 114, 120 may in certain embodiments may comprise a write cache partitioned into one or more ranks, where each rank may include one or more storage tracks. The cache 114, 120 may be any suitable cache known in the art or developed in the future. In some embodiments, the cache 114, 120 may be implemented with a volatile memory and/or non-volatile memory. The cache 114, 120 may store both modified and unmodified data.

The NVS 116, 122 may also be referred to as a "persistent" cache and is implemented with non-volatile memory comprising NVDIMMs. The NVS 116, 122 may store modified data. An application is made aware that an I/O operation is complete once data has successfully been written to cache and the NVS. Data integrity and availability is maintained by retaining two copies of the data until it is hardened to disk, one copy in cache on one server and the second in NVS of the other server. Normal access to the data is from the copy retained in the cache.

The safe data commit scan application 112 may periodically (e.g., every one hour) execute a safe data commit scan to destage at least modified data to the secondary storage 126, 128. In certain embodiments, a synchronized safe data commit scan application 112 that executes in the storage system 102 provides a mechanism to check the arming status of the NVDIMMs 118, 124 prior to performing a safe data commit scan. In certain embodiments the synchronized safe data commit scan application 112 may comprise one or more applications or may be part of another application.

The synchronized safe data commit scan application 112 may execute in any or all of the servers 104, 106 or may be an application that executes when virtualization is performed to access the hardware elements of the storage system 102. In certain embodiments, the synchronized safe data commit scan application 112 may be implemented in software, firmware, hardware or any combination thereof.

It should be noted that the storage system 102 may be configured and accessed in many different ways. For example, virtualization may be performed to access the hardware elements of the storage system 102. Additionally, in certain embodiments, the storage system 102 may have more than two servers.

Figure 2:
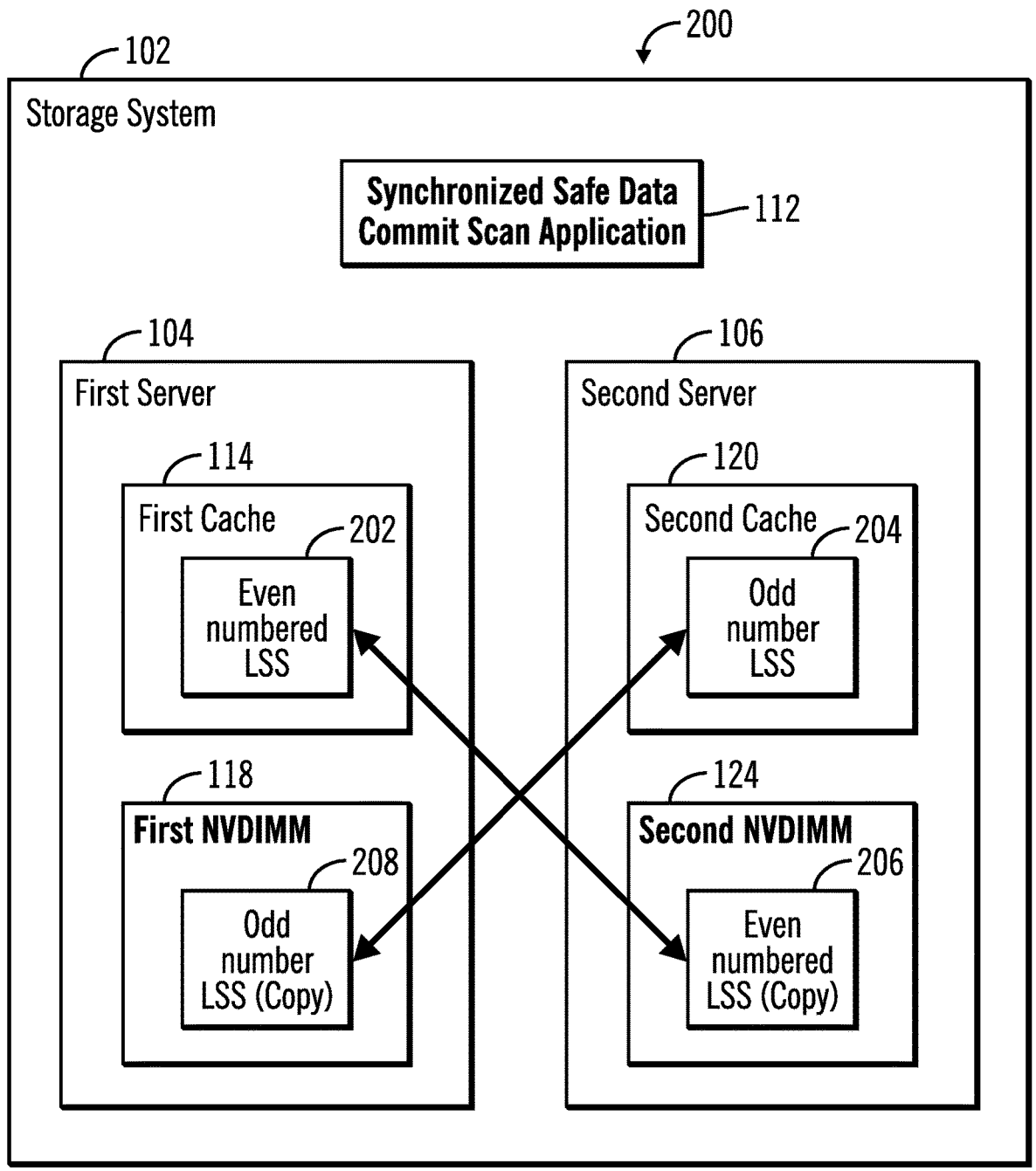
FIG. 2 illustrates a block diagram of the storage system with a first cache and a first NVS comprising a first NVDIMM controlled by the first server, and a second cache and a second NVS comprising a second NVDIMM controlled by the second server, in accordance with certain embodiments.

FIG. 2 illustrates a block diagram 200 of the storage system 102 with a first cache 114 and a first NVS comprising a first NVDIMM 118 controlled by the first server 104, and a second cache 120 and a second NVS comprising a second NVDIMM 124 controlled by the second server 106, in accordance with certain embodiments;

The first cache 114 is used for all logical volumes that are members of even numbered logical storage systems (LSS) 202. It may be noted than an LSS is a logical construct that groups logical volumes and logical units (LUN) in groups, where in certain embodiments the LSSs may be numbered via integers starting from 0 to and ending at 255 if there are 256 LSSs. Likewise, the second cache 120 is used for all logical volumes that are members of odd numbered LSSs 204. For every write that is placed into the first cache 114 of the first server 104, a copy 206 is placed into the second NVDIMM 124 that is in the second server 106. For every write that is placed into the second cache 120 of the second server 106, a copy 208 is placed into the first NVDIMM 118 that is in the first server 104. As a result, in case of failure of the first server 104, the second server 106 may be used for recovery of data, and in case of failure of the second server 106 the first server 104 may be used for the recovery of data.

Figure 3:
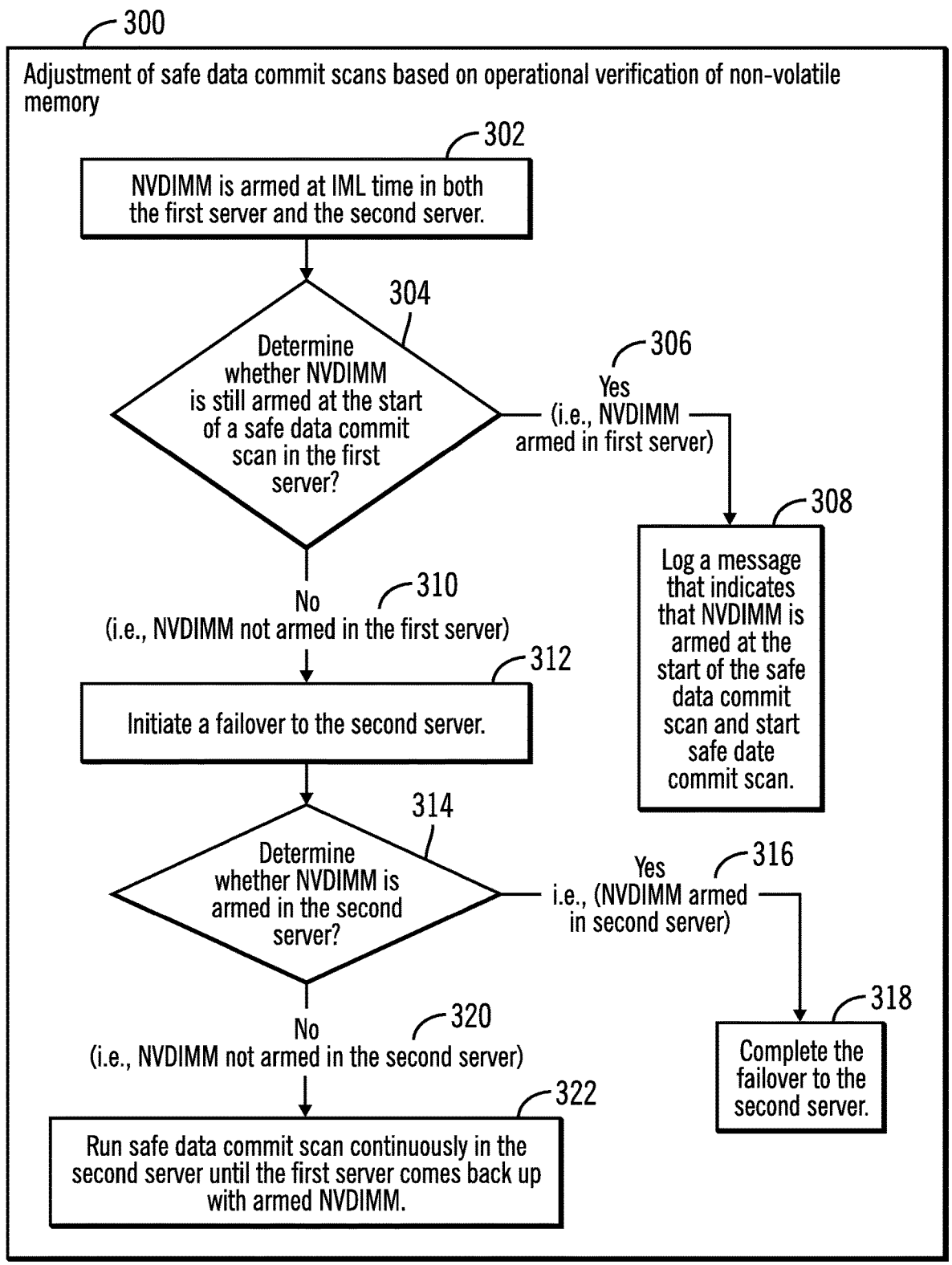
FIG. 3 illustrates a flowchart that shows operations for adjustment of safe data commit scans based on operational verification of non-volatile memory, in accordance with certain embodiments.

FIG. 3 illustrates a flowchart 300 that shows operations for adjustment of safe data commit scans based on operational verification of non-volatile memory, in accordance with certain embodiments. The operations shown in FIG. 3 may be performed in the storage system 102.

Control starts at block 302 in which the first NVDIMM 118 is armed at the time of IML in the first server 104, and the second NVDIMM 124 is armed at the time of IML in the second server 106. Control proceeds to block 304 in which the synchronized safe data commit scan application 112 determines whether the first NVDIMM 118 is still armed at the start of a safe data commit scan in the first server 104. If so ("Yes" branch 306) control proceeds to block 308 in which the synchronized safe data commit scan application 112 logs a message that indicates that the first NVDIMM 118 is armed at the start of the safe data commit scan in the first server 104 and starts the safe data commit scan.

If at block 304 the synchronized safe data commit scan application 112 determines that the first NVDIMM 118 is not armed ("No" branch 310) at the start of a safe data commit scan in the first server 104, control proceeds to block 312 in which a failover is initiated to the second server 106 and then a determination is made (at block 314) as to whether the second NVDIMM 124 is armed in the second server 106. It should be noted that even though the first NVDIMM 118 was armed during IML in the first server 104, the first NVDIMM 118 may lose its armed status in the time interval between the IML, and the start of the safe data commit scan because of a defect in the first server 104.

If at block 314 it is determined that the second NVDIMM 124 is armed ("Yes" branch 316) in the second server 106, control proceeds to block 318 in which the failover to the second server 106 is completed.

If at block 314 it is determined that the second NVDIMM 124 is not armed ("No" branch 320) in the second server 106, control proceeds to block 322 in which safe data commit scans are run continuously in the second server 106, until the first server 104 comes back up with an armed first NVDIMM 118. "Running continuously" for safe data commit scans means that as soon as a safe data commit scan is completed, another safe data scan is started. The safe data scans are run continuously because it is necessary to save data as quickly as possible on the secondary storage 126, 128 when both the first NVDIMM 118 and the second NVDIMM 124 are not armed and therefore prone to losing data in the event of a power loss. When both the first NVDIMM 118 and the second NVDIMM 124 are not armed, the redundancy of having two servers in the storage system 102 is partially lost as there could be data loss on power failure.

Figure 4:
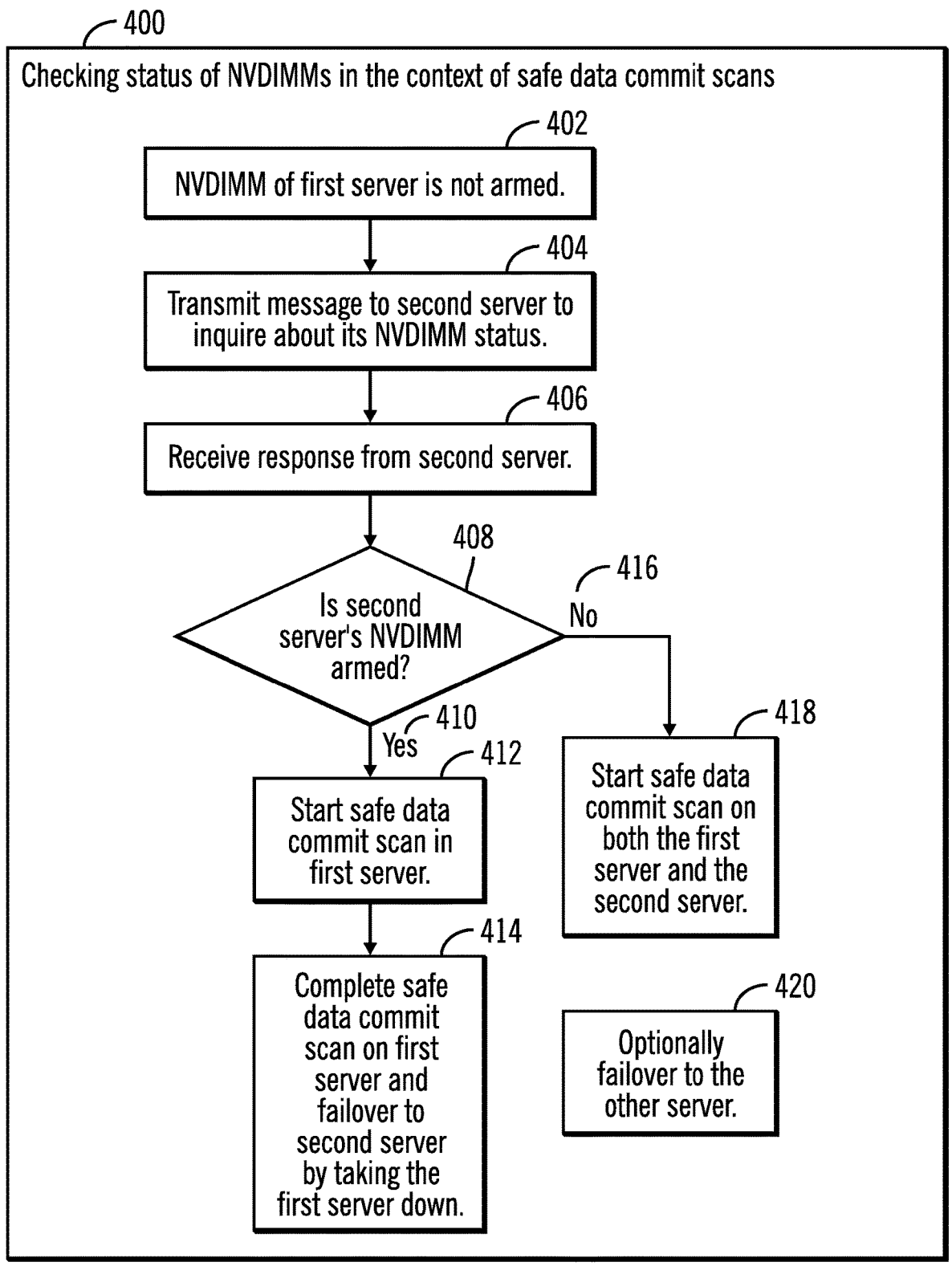
FIG. 4 illustrates a flowchart that shows operations for checking status of NVDIMMs in the context of safe data commit scans.

FIG. 4 illustrates a flowchart 400 that shows operations for checking status of NVDIMMs in the context of safe data commit scans. The operations shown in FIG. 4 may be performed in the storage system 102.

Control starts at block 402 in which a determination is made that the first NVDIMM 118 of the first server 104 is not armed. A message is transmitted (at block 404) to the second server 106 to inquire about the status of the second NVDIMM 124 of the second server 106. A response is received (at block 406) from the second server 106 and a determination is made (at block 408) as to whether the second NVDIMM 124 of the second server 106 is armed.

If at block 408 it is determined that the second NVDIMM 124 of the second server 106 is armed ("Yes" branch 410) control proceeds to block 412 in which the synchronized safe data commit scan application 112 starts a safe data commit scan in the first server 104. On completion of the safe data commit scan on the first server 104, a failover is performed (at block 414) to the second server 106 by taking the first server 104 down.

If at block 408 it is determined that the second NVDIMM 124 of the second server 106 is not armed ("No" branch 416) control proceeds to block 418 in which safe data commit scans are started on both the first server 104 and the second server 106 and an optional failover to the second server 106 may be performed (at block 420).

Figure 5:
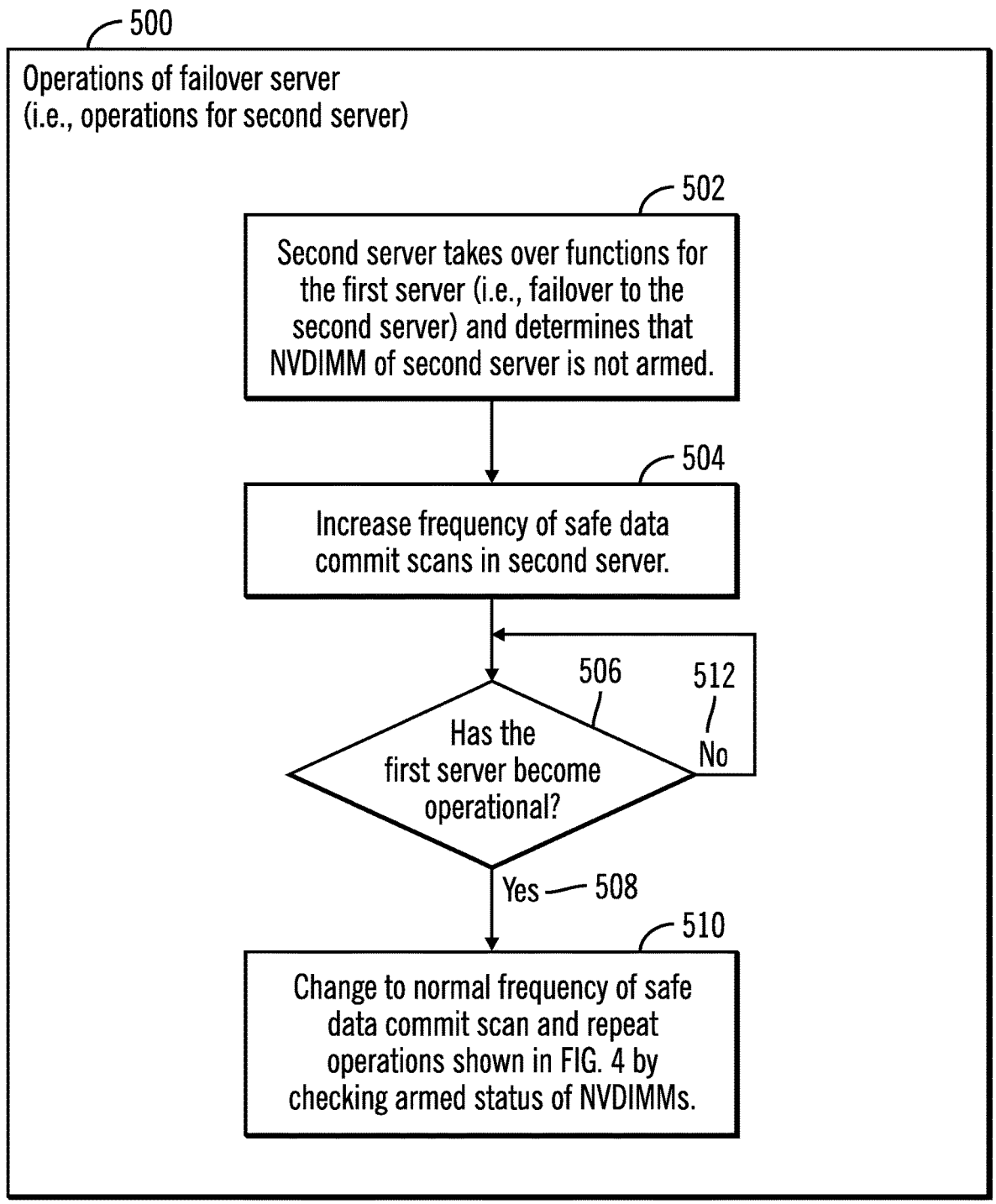
FIG. 5 illustrates a flowchart that shows operations of a failover server, in accordance with certain embodiments.

FIG. 5 illustrates a flowchart 500 that shows operations of a failover server (e.g., the second server 106), in accordance with certain embodiments. The operations shown in FIG. 5 may be performed in the storage system 102.

Control starts at block 502 in which the second server 106 takes over the functions of the first server 104 (i.e., a failover has occurred from the first server 104 to the second server 106) and determines that the second NVDIMM 124 of the second server 106 is not armed. The second server 106 then increases the frequency of safe data commits scans in the second server 106 as data is likely to be lost in the second NVDIMM 124 of the second server 106 in the event of a power loss. For example, instead of running a safe data commit scan every hour (i.e., in this example the standard time interval between successive safe data commit scans is one hour) which may be the normal frequency of safe data commit scans, safe data commit scans may be run every 15 minutes (i.e., the time interval between successive safe data commit scans is decreased from the standard time interval).

From block 504 control proceeds to block 506 in which a determination is made as to whether the first server 104 has become operational. If at block 506 a determination is made that the first server 104 has become operational ("Yes" branch 508) control proceeds to block 510 in which safe data commits scans revert back to the normal frequency of safe data commit scans and where the operations shown in FIG. 4 are performed by checking the armed status of NVDIMMs. The checking of the armed status of NVDIMMs needs to be performed because the "Yes" branch 508 from block 506 indicates a failback to a dual server configuration (i.e., both servers are operational), wherein in the dual server configuration NVDIMMs may not be armed even though both servers are operational. It should also be noted that the checking for the armed status of NVDIMMs may be performed periodically.

If at block 506 it is determined the first server 104 has not become operational ("No" branch 512), then a new check of whether the first server 104 has become operational is performed once again at block 506.

Thus FIG. 5 illustrates certain embodiments in which the frequency of safe data commit scans is increased when both NVDIMMs have become unarmed ((i.e., not armed) on both servers 104, 106, in order to reduce the amount of data loss on power failure.

Figure 6:
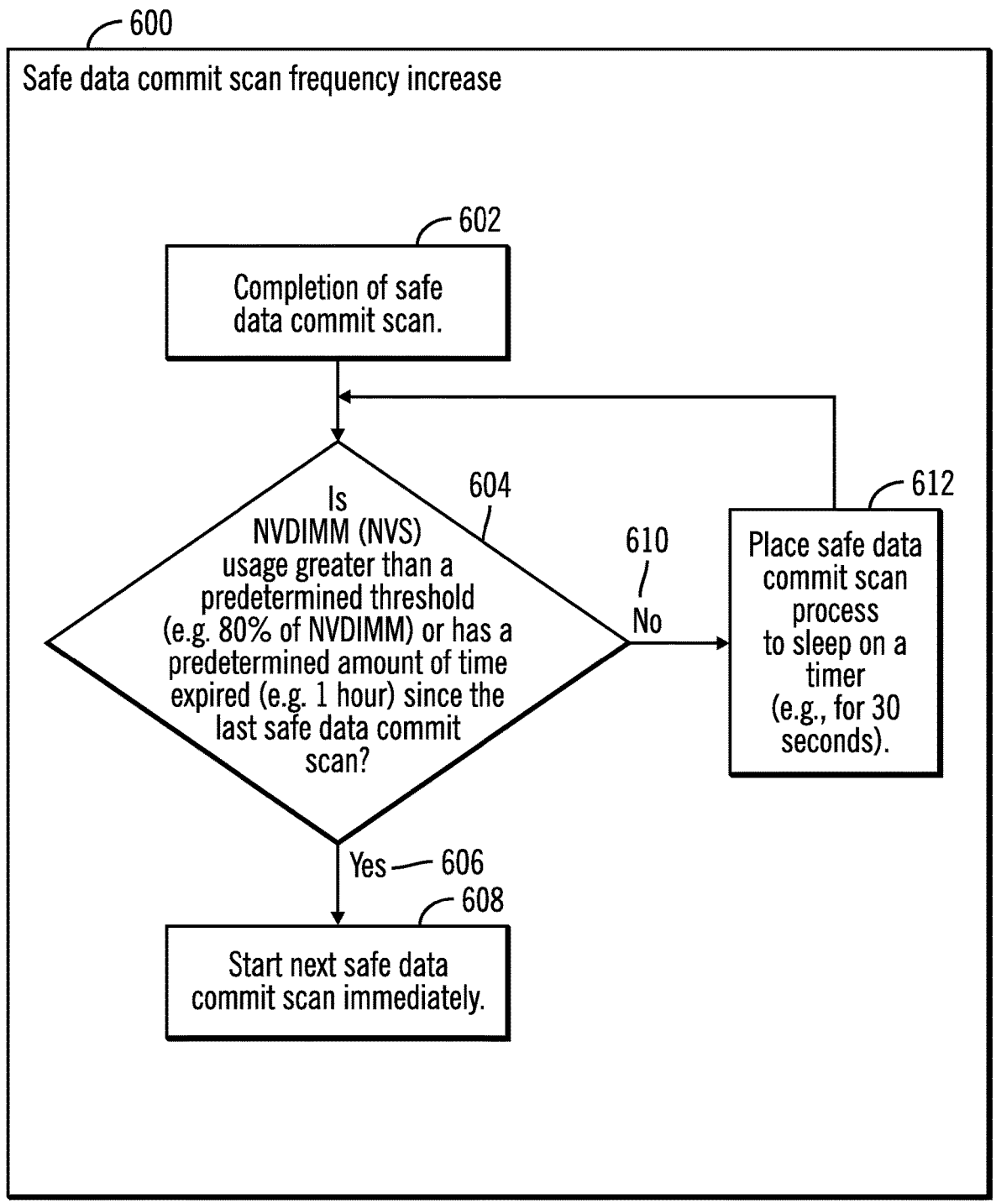
FIG. 6 illustrates a flowchart that shows operations that show the increase in frequency of safe data commit scans, in accordance with certain embodiments.

FIG. 6 illustrates a flowchart 600 that shows operations that show the increase in frequency of safe data commit scans, in accordance with certain embodiments. The operations shown in FIG. 6 may be performed in the storage system 102.

Control starts at block 602 in which a completion of safe data commit scan is deemed to have occurred. Control proceeds to block 604 in which a determination is made as to whether the usage of NVDIMM is greater than a predetermined threshold (e.g., 80% of NVDIMM storage) or whether a predetermined amount of time (e.g., 1 hour) has expired since the last safe data commit scan.

If at block 604, a determination is made that the usage of NVDIMM is greater than a predetermined threshold or that a predetermined amount of time has expired since the last safe data commit scan ("Yes" branch 606) control proceeds to block 608 in which the next safe data commit scan is started immediately (i.e., without waiting for more than a few seconds).

If at block 602, it is determined that the condition of "determine whether the usage of NVDIMM is greater than a predetermined threshold or that a predetermined amount of time has expired since the last safe data commit scan" leads to an answer of "No" ("No" branch 610) control proceeds to block 612 in which a safe data commit scan process to start the next safe data commit scan is placed to sleep on a timer (e.g., for 30 seconds) before a determination is made again as to whether the NVDIMM usage is greater than a predetermined threshold or a predetermined amount of time has expired since the last safe data commit scan (at block 604).

Therefore, FIG. 6 illustrates embodiments in which the frequency of safe data commit scans are adjusted based on the amount of usage of NVDIMM (e.g., usage may be defined as how much of an NVDIMM is full with data that may be lost on power failure). A greater usage may lead to an increase in frequency of safe data commit scans. However, the safe data commit scan frequency does not fall below the normal frequency (e.g., once every hour).

Figure 7:
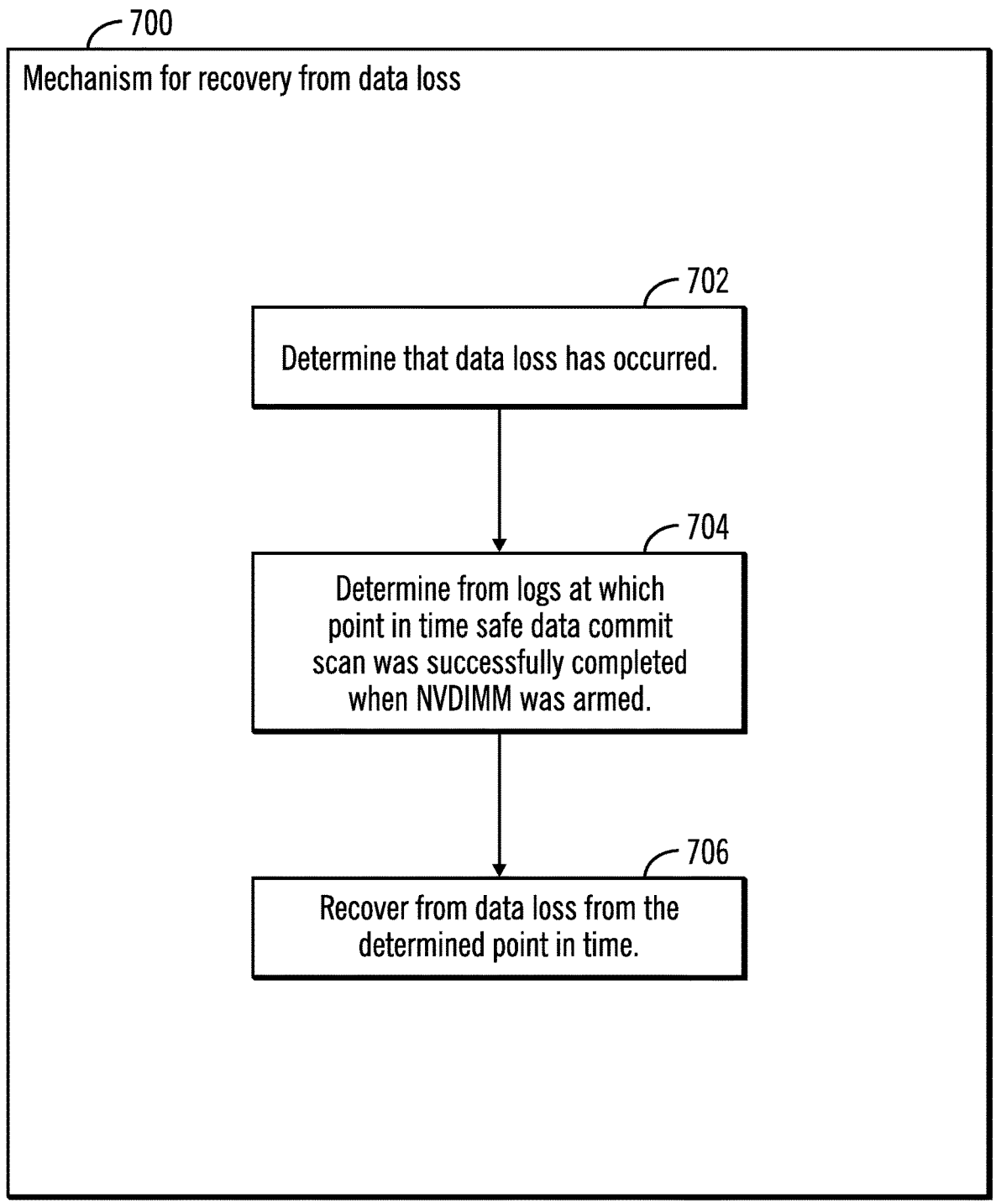
FIG. 7 illustrates a flowchart that shows operations that show mechanisms for recovery from data loss, in accordance with certain embodiments.

FIG. 7 illustrates a flowchart 700 that shows operations that show mechanisms for recovery from data loss, in accordance with certain embodiments. The operations shown in FIG. 7 may be performed in the storage system 102.

Control starts at block 702 in which a determination is made that a data loss has occurred. A determination is made (at block 704) from analysis of logs, of the point in time at which the last safe data commit scan was successfully completed when the NVDIMM was armed, and the recovery from data loss is made from the determined point in time (at block 706) from destaged data to the secondary storage 126, 128.

Figure 8:
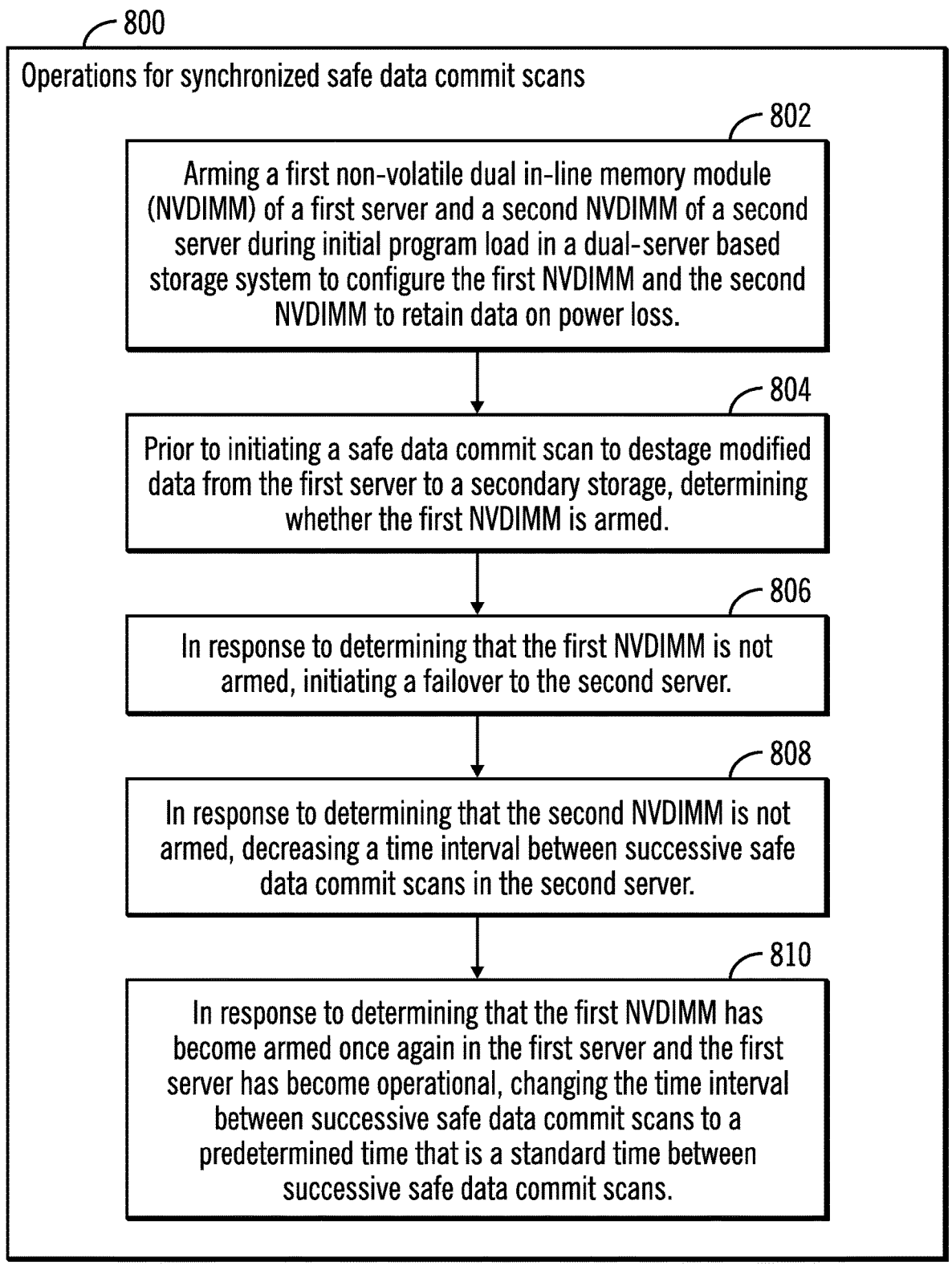
FIG. 8 illustrates a flowchart that shows operations for synchronized safe data commit scans in a dual-server based storage system, in accordance with certain embodiments.

FIG. 8 illustrates a flowchart 800 that shows operations for synchronized safe data commit scans in a dual-server based storage system 102, in accordance with certain embodiments. The operations shown in FIG. 8 may be performed in the dual-server based storage system 102.

Control starts at block 802 in which a first non-volatile dual in-line memory module (NVDIMM) 118 of a first server 104 and a second NVDIMM 124 of a second server 106 are armed during initial program load in a dual-server based storage system 102 to configure the first NVDIMM 118 and the second NVDIMM 124 to retain data on power loss. Prior to initiating a safe data commit scan to destage modified data from the first server 104 to a secondary storage 126, 128, a determination is made (at block 804) as to whether the first NVDIMM 118 is armed. In response to determining that the first NVDIMM 118 is not armed, a failover is initiated (at block 806) to the second server 106.

From block 806 control proceeds to block 808 in which in response to determining that the second NVDIMM 124 is not armed, a time interval between successive safe data commit scans in the second server 106 is decreased (i.e., the safe data commit scans occur at a greater frequency than normal).

From block 808 control proceeds to block 810, in which in response to determining that the first NVDIMM 118 has become armed once again in the first server 104 and the first server 104 has become operational, the time interval between successive safe data commit scans is changed to a predetermined time that is a standard time between successive safe data commit scans (i.e., the safe data commit scans revert back to a normal frequency).

Therefore, FIGS. 1-8 illustrate certain embodiments in which safe data commit scans are adjusted based on failures of NVDIMMs in servers of a dual-server storage system. It should be noted that while the embodiments are described with respect to a first server and a second server, the roles of the two servers may be reversed.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
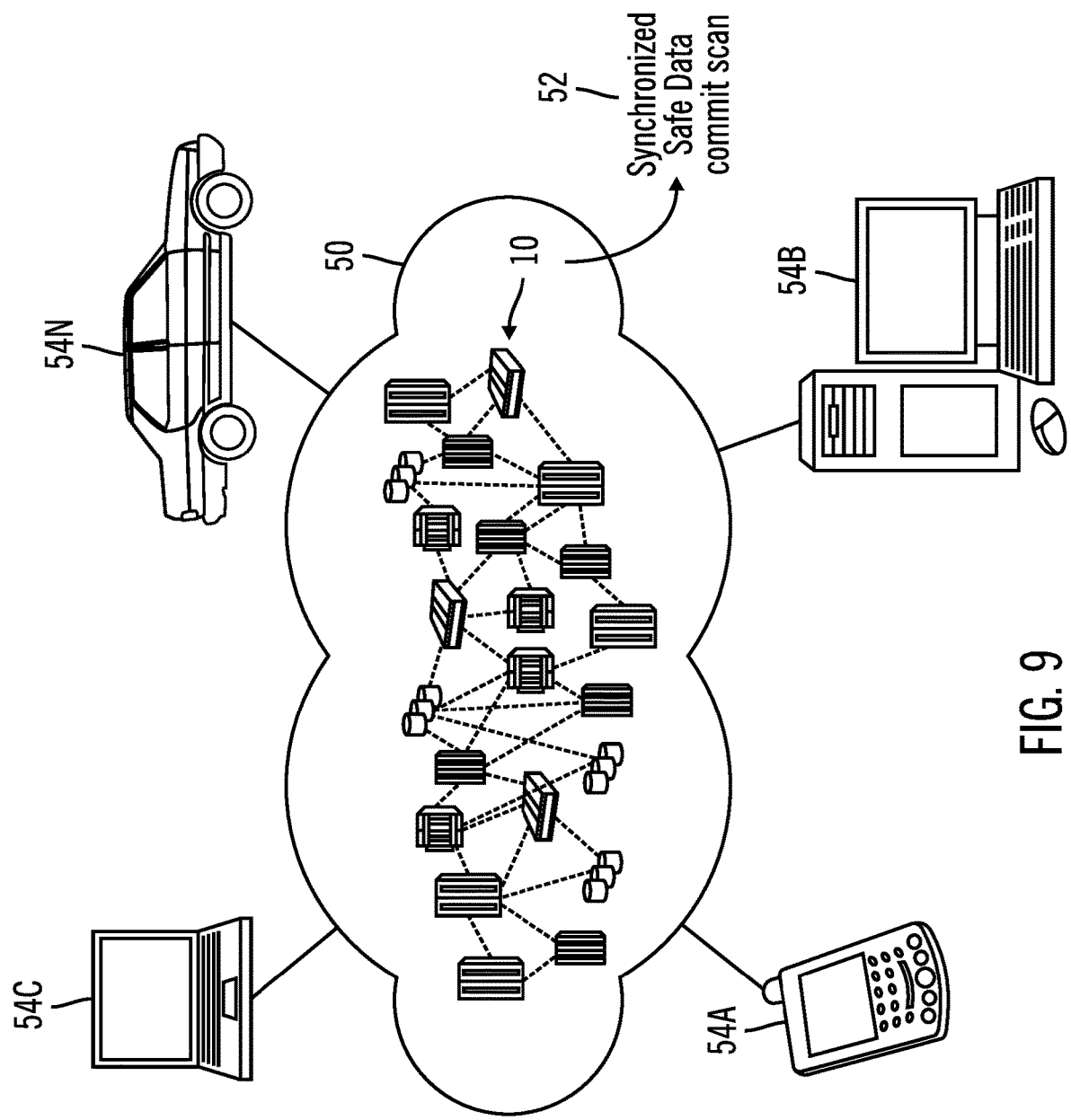
FIG. 9 illustrates a block diagram of a cloud computing environment, in accordance with certain embodiments.

Referring now to FIG. 9 an illustrative cloud computing environment 50 is depicted. Synchronized safe data commit scan (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
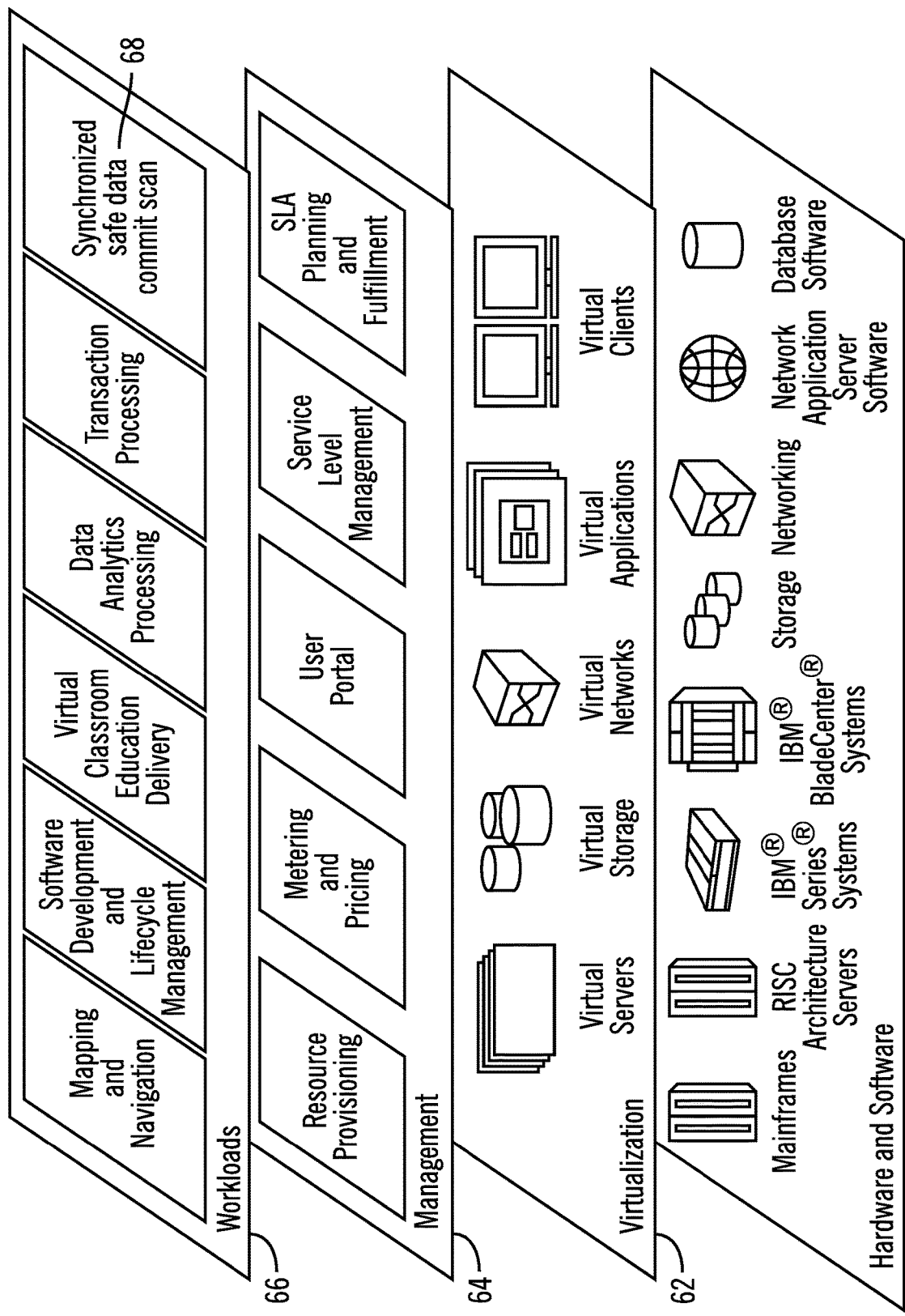
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

*IBM, ZSERIES, PSERIES, XSERIES, BLADECENTER, WEBSPHERE, and DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and synchronized safe data commit scan 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
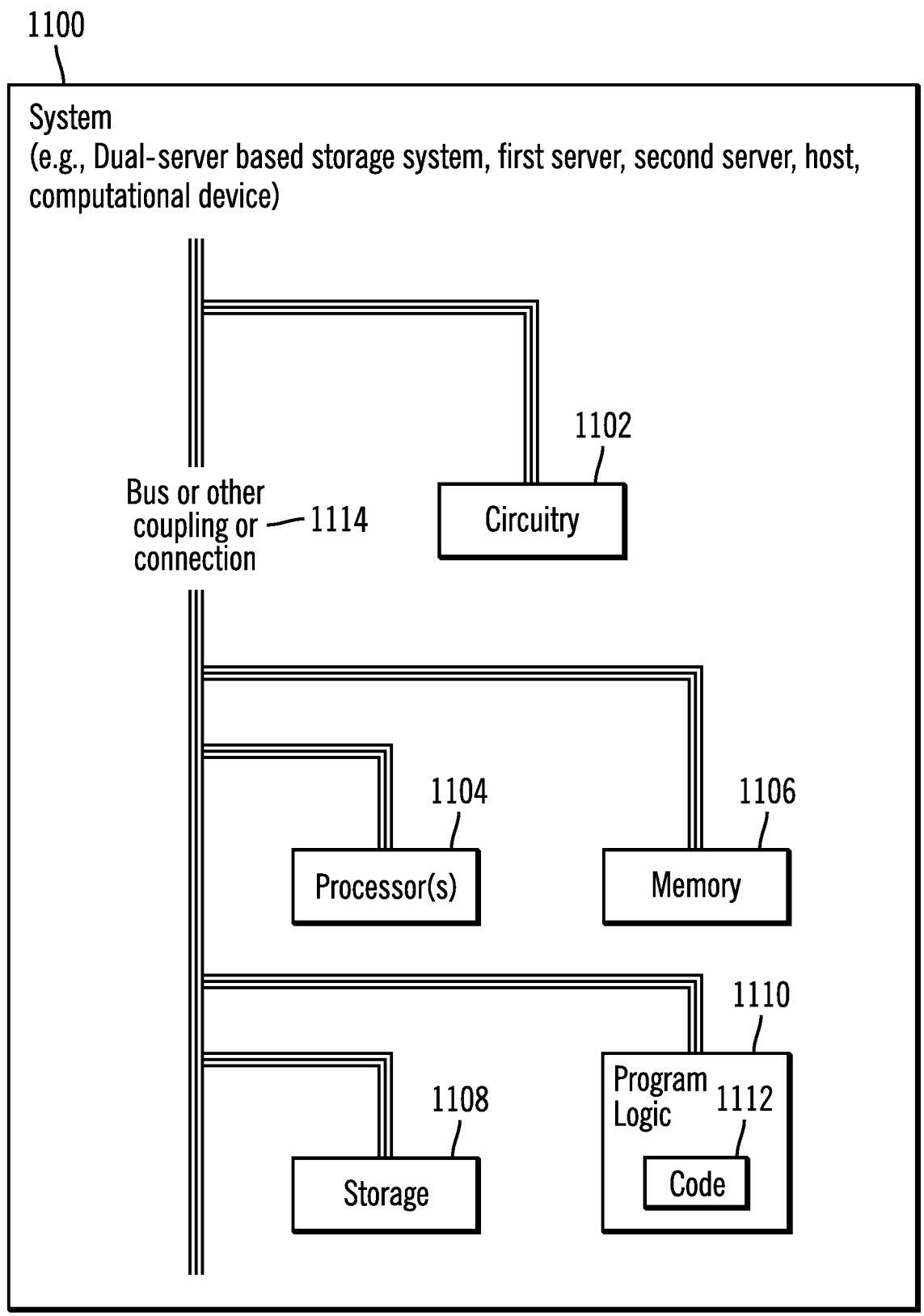
FIG. 11 illustrates a block diagram of a computational system that shows certain elements that may be included in the dual-server based storage system and/or the host(s), as described in FIGS. 1-10, in accordance with certain embodiments.

FIG. 11 illustrates a block diagram that shows certain elements that may be included in the dual-server based storage system 102 and/or the servers 104, 106 or other devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
arming a first non-volatile dual in-line memory module (NVDIMM) of a first server and a second NVDIMM of a second server during initial program load in a dual-server based storage system to configure the first NVDIMM and the second NVDIMM to retain data on power loss;
in response to determining that the first NVDIMM is not armed, initiating a failover to the second server;
in response to the failover to the second server, determining that the second NVDIMM is not armed; and
in response to determining that the second NVDIMM is not armed, decreasing a time interval between successive safe data commit scans in the second server.

2. The method of claim 1, the method further comprising:
in response to determining that the first NVDIMM has become armed once again in the first server and the first server has become operational, changing the time interval between successive safe data commit scans to a predetermined time that is a standard time between successive safe data commit scans.

3. The method of claim 1, the method further comprising:
in response to completion of a safe data commit scan in the second server, and in response to determining that NVDIMM usage in the second server is greater than a predetermined threshold or a predetermined time that is a standard time between successive safe data commit scans has expired, starting a new safe data commit scan.

4. The method of claim 1, the method further comprising in response to determining that the second NVDIMM is armed, completing the failover to the second server.

5. The method of claim 1, wherein the dual-server based storage system maintains a first cache and a first non-volatile storage (NVS) comprising the first NVDIMM in the first server, and a second cache and a second NVS comprising the second NVDIMM in the second server, wherein data in the first cache is also written in the second NVS and data in the second cache is also written in the first NVS.

6. The method of claim 1, wherein the first NVDIMM or the second NVDIMM becomes unarmed after the initial program load, in response to a defect in the dual-server based storage system.

7. A system, comprising:
a memory; and
a processor coupled to the memory, wherein the processor performs operations, the operations comprising:
arming a first non-volatile dual in-line memory module (NVDIMM) of a first server and a second NVDIMM of a second server during initial program load in a dual-server based storage system to configure the first NVDIMM and the second NVDIMM to retain data on power loss;
in response to determining that the first NVDIMM is not armed, initiating a failover to the second server;
in response to the failover to the second server, determining that the second NVDIMM is not armed; and
in response to determining that the second NVDIMM is not armed, decreasing a time interval between successive safe data commit scans in the second server.

8. The system of claim 7, the operations further comprising:
in response to determining that the first NVDIMM has become armed once again in the first server and the first server has become operational, changing the time interval between successive safe data commit scans to a predetermined time that is a standard time between successive safe data commit scans.

9. The system of claim 7, the operations further comprising:
in response to completion of a safe data commit scan in the second server, and in response to determining that NVDIMM usage in the second server is greater than a predetermined threshold or a predetermined time that is a standard time between successive safe data commit scans has expired, starting a new safe data commit scan.

10. The system of claim 7, the operations further comprising
in response to determining that the second NVDIMM is armed, completing the failover to the second server.

11. The system of claim 7, wherein the dual-server based storage system maintains a first cache and a first non-volatile storage (NVS) comprising the first NVDIMM in the first server, and a second cache and a second NVS comprising the second NVDIMM in the second server, wherein data in the first cache is also written in the second NVS and data in the second cache is also written in the first NVS.

12. The system of claim 7, wherein the first NVDIMM or the second NVDIMM becomes unarmed after the initial program load, in response to a defect in the dual-server based storage system.

13. A computer program product, the computer program product comprising a computer readable storage medium having computer readable program code embodied there-with, the computer readable program code configured to perform operations in a dual-server based storage system, the operations comprising:

arming a first non-volatile dual in-line memory module (NVDIMM) of a first server and a second NVDIMM of a second server during initial program load in the dual-server based storage system to configure the first NVDIMM and the second NVDIMM to retain data on power loss;

in response to determining that the first NVDIMM is not armed, initiating a failover to the second server;

in response to the failover to the second server, determining that the second NVDIMM is not armed; and in response to determining that the second NVDIMM is not armed, decreasing a time interval between successive safe data commit scans in the second server.

14. The computer program product of claim 13, the operations further comprising:

in response to determining that the first NVDIMM has become armed once again in the first server and the first server has become operational, changing the time interval between successive safe data commit scans to a predetermined time that is a standard time between successive safe data commit scans.

15. The computer program product of claim 13, the operations further comprising:

in response to completion of a safe data commit scan in the second server, and in response to determining that NVDIMM usage in the second server is greater than a predetermined threshold or a predetermined time that is a standard time between successive safe data commit scans has expired, starting a new safe data commit scan.

16. The computer program product of claim 13, the operations further comprising in response to determining that the second NVDIMM is armed, completing the failover to the second server.

17. The computer program product of claim 13, wherein the dual-server based storage system maintains a first cache and a first non-volatile storage (NVS) comprising the first NVDIMM in the first server, and a second cache and a second NVS comprising the second NVDIMM in the second server, wherein data in the first cache is also written in the second NVS and data in the second cache is also written in the first NVS.

18. The computer program product of claim 13, wherein the first NVDIMM or the second NVDIMM becomes unarmed after the initial program load, in response to a defect in the dual-server based storage system.

\* \* \* \* \*